United States Patent [19]

Howard

[11] 4,162,629
[45] Jul. 31, 1979

[54] TENSIVE FORCE LOAD CELL ASSEMBLY

[75] Inventor: Clayton L. Howard, Santa Rosa, Calif.

[73] Assignee: Baker International Corporation, Orange, Calif.

[21] Appl. No.: 906,523

[22] Filed: May 16, 1978

[51] Int. Cl.² .................................................. G01L 1/26
[52] U.S. Cl. .................................. 73/141 R; 73/141 A
[58] Field of Search .................. 73/141 A, 143, 141 R

[56] References Cited

U.S. PATENT DOCUMENTS

| 680,371 | 8/1901 | Brittan | 73/141 R |
| 2,582,886 | 1/1952 | Ruge | 73/141 A |
| 2,641,926 | 6/1953 | Eisenbart | 73/141 R |
| 3,911,737 | 10/1975 | Ormond | 73/141 A |
| 4,058,178 | 11/1977 | Shinohara et al. | 73/141 A |

Primary Examiner—Anthony V. Ciarlante
Attorney, Agent, or Firm—William C. Norvell, Jr.

[57] ABSTRACT

A load cell assembly is provided utilizing a hydraulic load cell in combination with an electric load cell to eliminate undesired side loading and to provide two separate output signals indicative of a tensive load.

12 Claims, 3 Drawing Figures

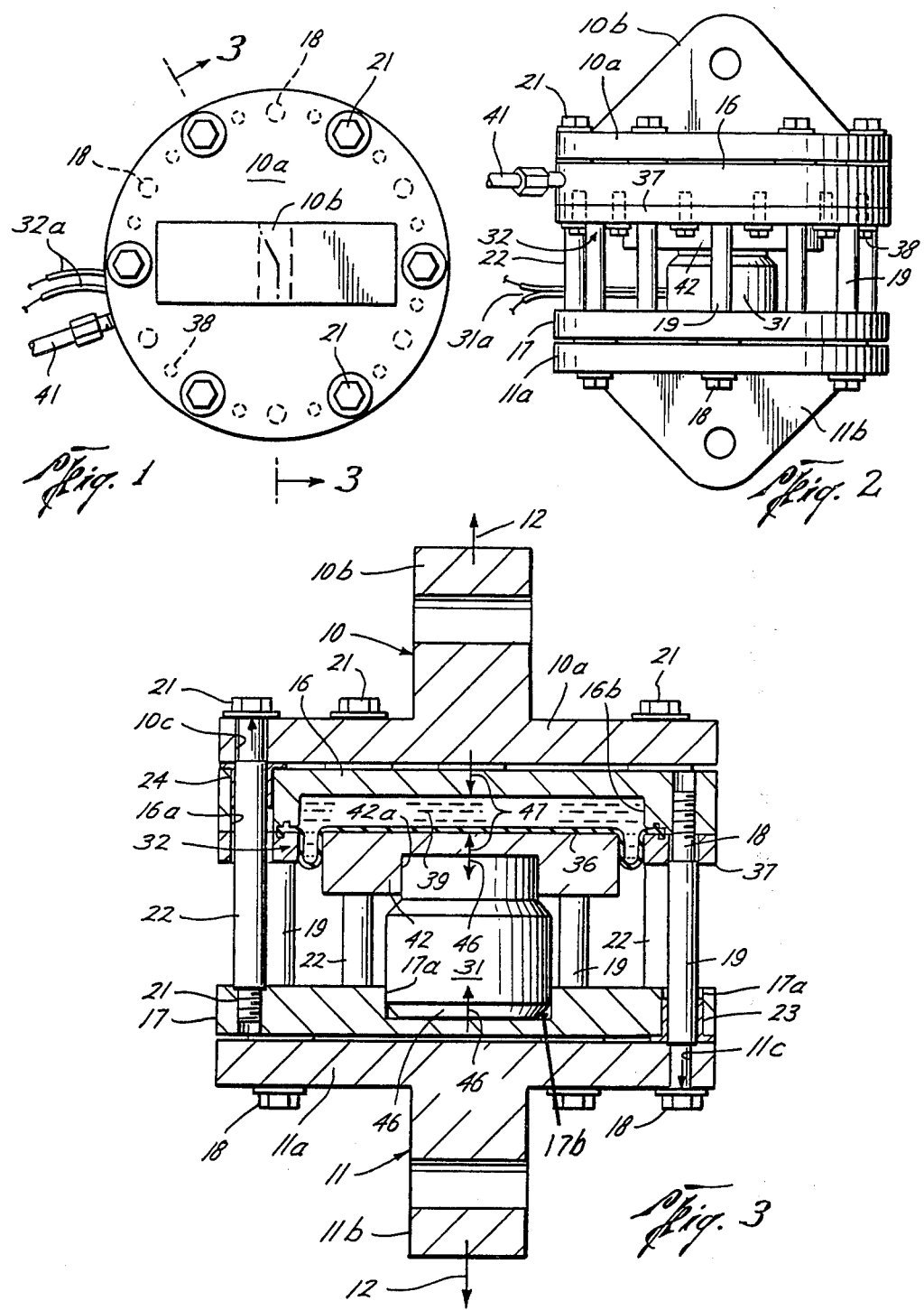

TENSIVE FORCE LOAD CELL ASSEMBLY

BACKGROUND OF THE INVENTION

1. Field of the Invention

This invention pertains generally to force measuring devices and more particularly to a load cell assembly for measuring tensive loads.

2. Description of the Prior Art

It is at times desirable to determine the weight of a suspended load, such as the weight of a load carried by a crane or the weight carried by the bit of a drilling rig, and there have been attempts to measure such weights with a load cell inserted in series with the cable or other element by which the load is supported. Since the output of a load cell is affected by the angle at which the load is applied to the cell, a problem exists if there is any non-axial component of force on the cell.

It is in general an object of the invention to provide a new and improved load cell assembly for tensive loads.

Another object of the invention is to provide a load cell assembly of the above character utilizing a hydraulic load cell in combination with an electronic load cell.

Another object of the invention is to provide a load cell assembly of the above character in which the hydraulic load cell prevents side loading of the electronic load cell.

Another object of the invention is to provide a load cell assembly of the above character which provides two separate output signals corresponding to the load.

Additional objects and features of the invention will be apparent from the following description in which the preferred embodiment is set forth in detail in conjunction with the accompanying drawings.

BRIEF DESCRIPTION OF THE DRAWINGS

FIG. 1 is a top planar view of one embodiment of a load cell assembly according to the invention.

FIG. 2 is a side elevational view of one embodiment of FIG. 1.

FIG. 3 is a cross sectional view taken along line 3—3 of FIG. 1.

SUMMARY OF THE INVENTION

The present invention provides a load cell assembly utilizing a hydraulic load cell in combination with an electric load cell to eliminate undesired side loading and to provide two separate output signals indicative of the load. The assembly includes two load receiving plates which tend to be drawn apart by a tensive load and two load cell plates connected to the load receiving plates in such manner that they tend to be drawn together by the tensive load. The two load cells are constrained between the load cell plates and deliver output signals corresponding to the compressive forces applied thereto.

DESCRIPTION OF THE PREFERRED EMBODIMENTS

The load cell assembly includes an upper load receiving member 10 and a lower load receiving member 11 to which a tensive load is applied in an axial direction, as indicated by arrows 12. The load receiving members comprise generally circular, radially extending plates 10a and 11a having axially disposed hooks or eyelets 10b and 11b on the outer sides thereof for connection to the load. These members are fabricated of a rigid material, such as steel, and in the embodiment illustrated, they are formed as unitary structures. Other solid materials also may be utilized.

The load receiving members are spaced axially apart, and radially extending load cell support plates 16, 17 are mounted between them. These plates are generally circular, and of the same diameter as load receiving plates 10a and 11a and they also are fabricated of a rigid material. Plate 16 is positioned toward the upper load receiving plate and rigidly connected to the lower load receiving plate by a plurality of peripherally spaced screws 18. These screws pass through complimentary clearance holes 11c in the lower plate and are threadedly received in the load cell plate. Spacer sleeves 19 are mounted on the screws and serve to hold the plates in a spaced, parallel relationship.

The load cell supporting plate 17 is positioned toward the lower load receiving plate 11a and is rigidly connected to the upper load receiving plate also by a plurality of peripherally spaced screws 21. These screws pass through complimentary clearance holes 10c in the plate 10a and are threadedly received in plate 17. Spacer sleeves 22 are mounted on screws 21 and serve to maintain the plates 10a and 17 in a spaced, parallel relationship.

Bolts 18 and spacers 19 pass through openings 17a in plate 17, and screws 21 and spacers 22 pass through openings 16a in plate 16. These openings are provided with bushings 23 and 24 which serve as guides and permit the two interconnected sets of plates to move axially of each other. Here, it can be noted that an axially applied tensive force tends to draw the load receiving plates 10a and 11a apart and tends to draw load cell supporting plates 16 and 17 together.

An electronic load cell 31 and a hydraulic load cell 32 are mounted between the plates 16 and 17. The load cell 31 is a conventional column-type strain gauge load cell having an electrical resistance dependent upon the compressive force applied thereto. This load cell is mounted on the plate 17 in a centrally disposed recess 17b formed therein. Electrical connections to load cell 31 are made by means of leads 31a.

The hydraulic load cell 32 includes a fluid chamber 16b formed in the load cell supporting plate 16. A radially extending flexible diaphragm 36 is mounted on the lower side of plate 16 and forms one wall of chamber 16b. The diaphragm is fabricated of a flexible material such as Viton, and it is secured to the plate 16 by an annular retaining ring 37 and a plurality of peripherally paced screws 38. A body of hydraulic fluid 39 is enclosed within the chamber, and a flow line 41 communicates with the chamber and can be connected to a suitable pressure responsive indicator. A piston 42 engages the outer surface of the diaphragm and the upper portion of the electronic load cell 31. This piston is formed with a centrally disposed recess 42a in which the upper portion of the electronic load cell is received.

Operation and use of the load cell assembly can be described briefly. It is assumed that a tensive load is applied to load receiving members 10 and 11, as indicated by the arrows 12 and that leads 31a and line 41 are connected to electrically and hydraulically actuated weight indicators, respectively. The tensive load tends to draw the plates 10a and 11a apart, thereby tending to draw the plates 16 and 17 together. This produces compressive forces on both load cells, as indicated by the arrows 46 and 47, and the load cells produce output signals corresponding to these forces. The flexible diaphragm of the hydraulic load cell permits the piston 42 to float and maintain the force on the electronic load cell in an axial direction at all times, with no side loading.

The invention has a number of important features and advantages. Undesired side loading of the electronic load cell is prevented by the hydraulic load cell, and the two load cells produce separate output signals which can be compared to check the operation of the system. If desired, one of the load cells can be used as a backup for the other in the event of a malfunction of either cell.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a load measuring apparatus for providing an output signal corresponding to a tensive load: first and second spaced apart load receiving members to which the load is applied in a manner urging the members apart; first and second load transmissive members connected respectively to the first and second load receiving members and positioned toward the opposite ones thereof, whereby a tensive load applied to the load receiving members urges the load transmissive members together; an output transducer mounted to the first load transmissive member for delivering an output signal corresponding to the compressive load applied thereto; and fluid filled means disposed between the transducer and the second load transmissive member for transmitting a load from said second load transmissive member to the transducer.

2. The load measuring apparatus of claim 1 wherein the fluid filled means comprises a hydraulic load cell for providing an output signal corresponding to the compressive load applied thereto.

3. The load measuring apparatus of claim 1 wherein the fluid filled means comprises a body of fluid enclosed in a chamber affixed to the second force transmissive member, a flexible diaphragm forming one wall of the chamber, and a piston member engaging the diaphragm and the output transducer.

4. The load measuring apparatus of claim 1 wherein the output transducer comprises an electrical load cell.

5. The load measuring apparatus of claim 1 wherein the respective load receiving and load transmissive members are connected together by rigid tie rods passing through openings in one of the load transmissive members.

6. In a load cell assembly for providing an output signal corresponding to an axially applied tensive load: first and second axially spaced apart radially extending load receiving plates having axially disposed hook means on the outer sides thereof for connection to the load; first and second radially extending load cell plates disposed between the load receiving plates, the first load cell plate being positioned toward the second load receiving plate and the second load cell plate being positioned toward the first load receiving plate; rigid means connecting the first and second load receiving plates respectively to the first and second load cell plates; an electrical load cell centrally mounted on the first load cell plate for delivering an output singal corresponding to the force applied thereto; a centrally disposed chamber formed in the second load cell plate; a body of fluid enclosed within the chamber; a radially extending flexible diaphragm mounted on the second load cell plate and forming one wall of the chamber; and piston means disposed between the diaphragm and the load cell for transmitting force between the diaphragm and the load cell.

7. The load cell of claim 6 additionally comprising a flow line communicating with the chamber in the second load cell plate for providing a fluid output signal corresponding to the force applied to the diaphragm.

8. The load cell assembly of claim 6 wherein the means connecting the load receiving plates to the load cell plates comprises a plurality of rigid tie rod members extending between the respective plates in an axial direction and passing through openings in one of the plates.

9. The load cell assembly of claim 6 additionally comprising an annular retaining ring securing the diaphragm to the second load cell plate.

10. The load cell assembly of claim 6 wherein the first load cell plate is formed with a central recess in which the load cell is mounted.

11. The load cell assembly of claim 6 wherein the fluid in the chamber is a hydraulic fluid.

12. In a load cell assembly: first and second spaced apart load receiving members to which a tensive load is applied in a manner to urge the members apart; first and second load cell supporting load receiving plate members and positioned whereby the tensive load applied to the load receiving members urges the plate members together; means connected to the first plate member for generating an electrical output signal corresponding to the compressive load applied thereto; and a hydraulic load cell mounted on the second plate member for delivering a hydraulic output signal corresponding to the compressive load applied thereto.

* * * * *